May 16, 1944.　　　P. M. SAMPATACOS　　　2,348,928
BEARING CONSTRUCTION
Filed Nov. 13, 1941　　　2 Sheets-Sheet 1

Inventor
Peter M. Sampatacos
By Geo. H. Kennedy Jr.
Attorney

May 16, 1944.   P. M. SAMPATACOS   2,348,928
BEARING CONSTRUCTION
Filed Nov. 13, 1941   2 Sheets-Sheet 2

Inventor
Peter M. Sampatacos
By
Geo. H. Kennedy Jr.
Attorney

Patented May 16, 1944

2,348,928

UNITED STATES PATENT OFFICE 2,348,928

BEARING CONSTRUCTION

Peter M. Sampatacos, Worcester, Mass., assignor to The Heald Machine Company, Worcester, Mass., a corporation of Massachusetts Application November 13, 1941, Serial No. 418,956

7 Claims. (Cl. 308—73)

The present invention relates to bearing constructions, and more particularly to a bearing of the so-called Michell type, wherein the rotary member is surrounded and supported by a plurality of segmental rockable shoes. Such rockable bearing shoes, because of their ability to maintain the oil film, despite widely varying conditions of speed and load, have come into use for the rotating shafts or spindles of various kinds of machine tools, such as grinding machines or the like.

Such a use for rocker-shoe bearings is illustrated by the Dall and Ernst Patent No. 2,160,778 of May 30, 1939. Said patent recognizes the tendencies, especially between the shoes of such a bearing, toward turbulence and cavitation of the film-forming lubricant, that may seriously detract from the bearing's stability in operation; and it is proposed in said patent to minimize such instability by maintaining a substantial pressure upon a body of said lubricant that completely submerges all of the rockable shoes.

According to my invention as hereinafter described, such tendencies toward turbulence and cavitation in the film-forming lubricant are effectually overcome in the spaces between the rocker shoes by so shaping the ends or edges of the shoes themselves, as to insure at all times a free and uniform flow of the lubricant into the wedge-shaped clearance space formed by each shoe with the surface of the rotating shaft or spindle. My invention also obtains increased stability of each shoe by an improved pivotal mounting therefor. Other and further objects and advantages of my invention will more fully appear from the following detailed description thereof, taken in connection with the accompanying drawings in which Fig. 1 is a fragmentary cross-sectional view illustrating the conventional construction and arrangement of rocker shoes in bearings of the type above mentioned.

Like reference characters refer to like parts in the different figures.

Figure 1:
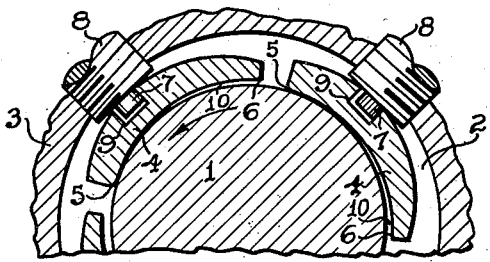

In the conventional rocker-shoe bearing arrangement shown by Fig. 1, the rotary member or shaft 1 is surrounded, in the bore 2 of its supporting housing 3, by a series of segmental shoes 4, 4, each of the latter providing an inner bearing surface on a radius of curvature substantially the same as that of the surface of shaft 1. Each shoe 4 is so mounted in bore 2 that it can have limited rocking movement on an axis substantially paralleling the shaft axis; in the conventional arrangement shown alike by Fig. 1 and by the aforesaid Dall and Ernst patent, the pivot for each shoe (customarily somewhat nearer the trailing end 5 than the leading end 6) is provided by a pin 7 projecting from an adjustable screw 8 carried by housing 3, and entered loosely in a recess 9 of the associated shoe. The screws 8 permit a slight clearance between the inner surface of each shoe 4 and the outer surface of shaft 1; assuming the latter to rotate in the direction of the arrow, Fig. 1, each shoe, when the shaft runs partly or wholly submerged in oil, is supposed to assume and maintain a position (shown exaggeratedly by Fig. 1), with its longer leading portion toward end 6 slightly spaced from the shaft whereas the trailing end should almost contact the shaft; these positions provide around the shaft the desired plurality of tapering or wedge-shaped lubrication pockets 10, 10 that are relied upon to maintain the oil film in the absence of metal-to-metal contact, and to resist undue displacement of the shaft axis.

In such bearings, the film of oil is carried around by the rotating shaft, and the desired action of the rocking shoes is largely dependent upon a free and uniform inflow of said oil into the inlet or leading ends of the several wedge-shaped pockets formed by the shoes. On account of the centrifugal force effective on said oil, and also the turbulence produced by the escape of said oil from the trailing ends of said pockets, this free and uniform inflow has been difficult of achievement; in the aforesaid Dall and Ernst patent it is sought to combat the effects of centrifugal force and turbulence as well as of cavitation by completely submerging the rocker shoes in a body of oil on which a substantial pressure is maintained.

Figure 2:
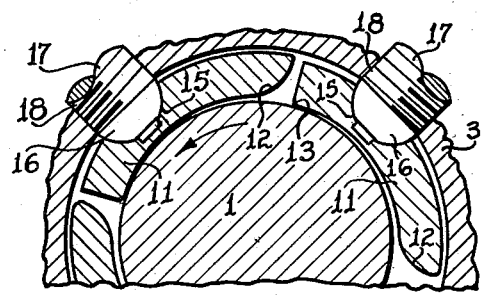
Figs. 2 and 3 are views similar to Fig. 1, illustrating the construction and mounting of the rocker shoes according to my invention.

I have discovered that the rocker shoes themselves can be so constructed and mounted as to avoid the effects of centrifugal force, turbulence and cavitation on the oil in the zones that contain the opposed ends or edges of adjacent rocker shoes. According to my invention, as shown in Fig. 2, the leading end or edge of each rocker shoe 11, instead of abruptly opposing (see Fig. 1) the oil escaping from the trailing edge of the preceding shoe, presents a convex surface 12 that merges smoothly with the inner face of the shoe, said surface 12 appearing in cross section as a second degree curve that connects the outer and inner faces of the shoe. Said surface 12 in overhanging relation to the rotating shaft or spindle 1 confines the oil emerging from beneath the preceding shoe, and secures said oil's guidance, with a material reduction of turbulence, into the wedge-shaped pocket.

Figure 3:
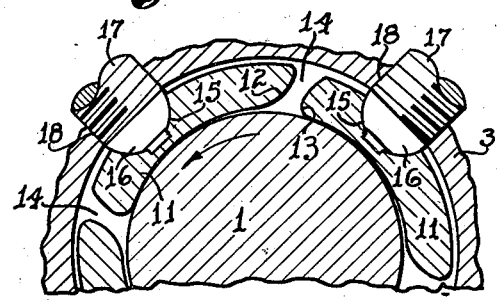

Preferably also, to further reduce turbulence and cavitation in the zones containing the opposed ends of adjacent shoe 11, 11, each shoe's trailing end or edge as shown in Fig. 3 is formed as a convex surface 13 that merges with the inner face of the shoe, and helps to prevent any abrupt change in the velocity of the oil escaping from beneath said shoe; the surfaces 12 and 13 of the adjacent shoes are thus complementary, in the formation between them of a gap or opening 14 which in cross section is of a constricted or venturi form that widens out rapidly toward the surface of rotary element or shaft 1, the center line or axis of this venturi section being non-radial to the rotational axis of shaft 1 in a very marked degree, and the deviation from radial being in the direction of said shaft's rotation; this special formation of the space between adjacent shoes 11, 11 operates against undue outward dispersal of the oil and promotes instead the uniform passage of same, by rotation of the shaft, into the wedge-shaped pocket beneath each shoe.

This uniform and steady passage of the oil on the shaft's surface across the space intervening between adjacent rocker shoes 11, 11, insures unimpaired maintenance of the oil film beneath each shoe and prevents any metal-to-metal contact of the parts—these results being obtained in my improved bearing by merely supplying lubricant in sufficient amount to partly submerge the shaft, and without any need for complete submergence of the shoes in a body of the lubricant or for keeping said lubricant under pressure by means extraneous to the bearing. Because of this uniformity of oil-film flow and maintenance, the position of shaft 1, once the shoes 11, 11 have been properly adjusted, is thoroughly stabilized, the oil films themselves effectively resisting any shifting tendency of the shaft axis, even under widely varying conditions of speed and load.

To promote this stability, each shoe 11, instead of being pivoted by the conventional pin-and-socket mounting 7, 9 shown by Fig. 1, is preferably pivoted by a mounting which affords ample surface contact between shoe and backing member, with no sacrifice of said shoe's ability to aline itself at all times with the shaft. To this end, the outer face of each shoe provides a socket 15 of semi-spherical form, adapted to receive the matching spherical end 16 of a backing member 17, each of the latter being externally threaded for adjustment inwardly or outwardly in suitable tapped holes 18 extending substantially radially of the bearing housing 3. Such ball and socket mountings for the rocker shoes eliminate all unnecessary play and give a substantial area of contact with each shoe, by which any heat generated therein by rapid rotation of the shaft or spindle is conducted away and dissipated through the body or housing 3.

Figure 4:
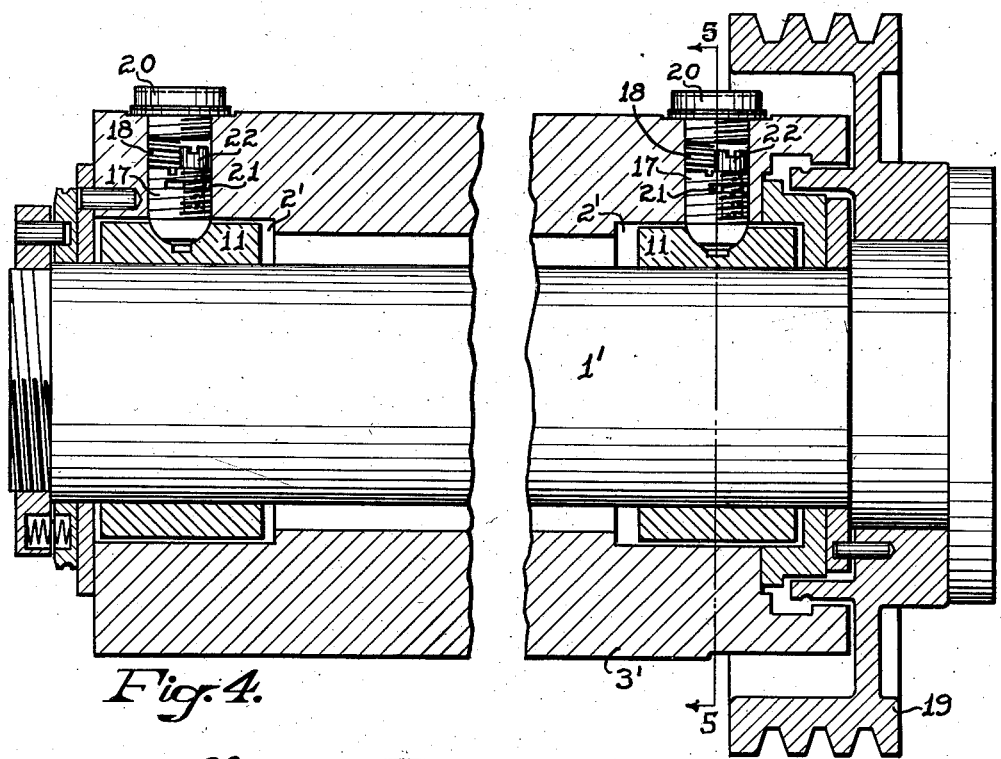
Fig. 4 is a longitudinal sectional view on line 4—4 of Fig. 5 illustrating an application of my improved bearings to a tool head.
Figure 5:
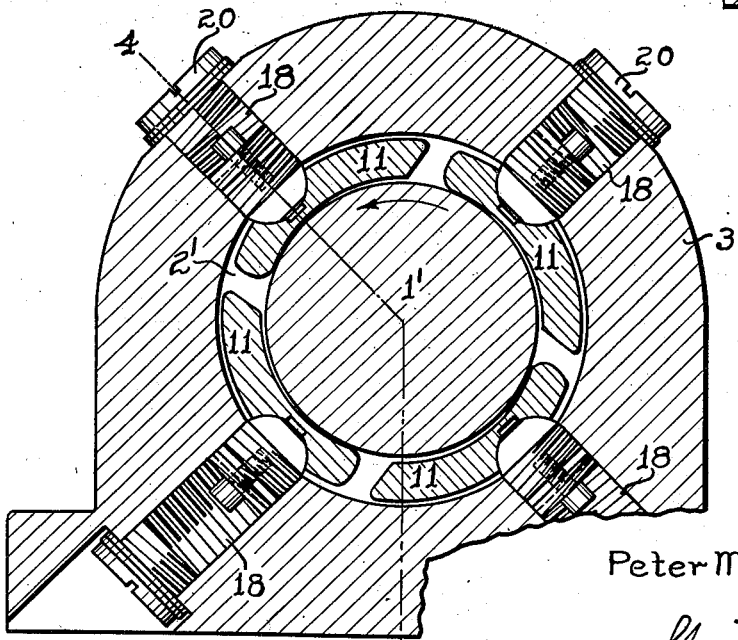
Fig. 5 is a cross sectional view on line 5—5 of Fig. 4.

Figs. 4 and 5 illustrate the application of a pair of my improved rocker shoe bearings to a tool head, for the rotative support of a spindle 1' carrying at one end a pulley 19 and at the other end a tool, not shown, such as a grinding wheel or a boring tool. The spindle 1' extends through the bore of housing 3', said bore being appropriately recessed at 2', 2' to receive the two sets of rocker shoes 11, 11, and there being equidistant radial tapped holes 18, 18 intersecting each recess 2', to receive the adjustable shoe-backing members 17, 17; said holes 18, 18, after adjustment of the members 17, 17 to the desired positions, are preferably closed by caps 20, 20 to exclude dirt and to prevent any escape of lubricant.

The backing members 17, 17 of Figs. 4 and 5 are adapted to be locked in the desired position of adjustment; to this end each member 17 is slotted circumferentially, as shown at 21, and adjacent its slot receives a screw 22, which when tightened down causes the external threads on member 17 to bind on the threads of tapped hole 18.

Figures 6, 7, 8:
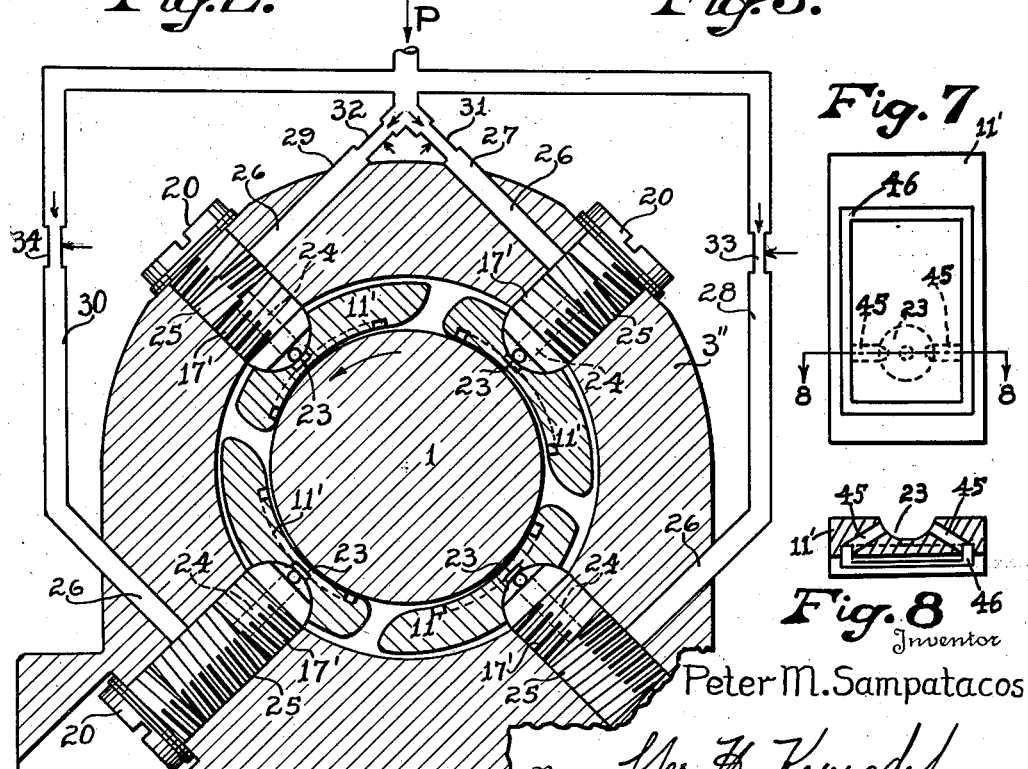
Fig. 6 is a view similar to Fig. 5, illustrating a modified lubricating arrangement.
Fig. 7 is a plan view of the bearing face of the type of shoe shown by Fig. 6.
Fig. 8 is a sectional view on line 8—8 of Fig. 7.

Although my improved bearing is intended primarily to relieve the necessity of putting the lubricant under pressure, it is recognized that abnormal cases may arise in which the load on the spindle is so heavy that the use of lubricant under pressure may be advisable, in order to further increase the stability and load capacity of the bearing. My invention lends itself most effectively to such pressure lubrication, as shown by Fig. 6, wherein each shoe 11' at the bottom of its spherical recess or socket provides a space 23, adjacent the inner end of its backing member 17', the latter having a central passage 24 connecting said inner space 23 with an outer space 25 (inwardly of cap 20) in the associated tapped hole 18 of housing 3''. As best shown in Figs. 7 and 8, each inner space 23 communicates through passages 45, 45 in the shoe with a groove 46 formed in the bearing surface of the shoe and corresponding substantially in shape or outline to the perimeter of the effective portion of said surface. As shown in Fig. 6, the several outer spaces 25, 25 are connected by bores 26, 26 of housing 3'' with suitable pipes or conduits 27, 28, 29 and 30 leading from a common source P of lubricant under pressure; each of said pipes provides an adjustable resistor of any desired form, as indicated respectively at 31, 32, 33 and 34, these being subject to manipulation and adjustment for controlling the pressure of the lubricant supplied to the groove 46 of each individual shoe, in order to compensate, if need be, for any abnormal load conditions tending to upset the stability of the bearing. By thus subjecting each shoe substantially in the line of its support, to the pressure of the lubricant, and by thus distributing said lubricant across the ends and along the sides of the wedge-shaped oil film pocket between shoe and shaft, I obtain a measurably greater stability for the shoes than can be obtained by merely maintaining a pressure on a body of lubricant in the space containing said shoes; moreover, in my improved arrangement shown by Fig. 6, the several resistors 31, 32, 33 and 34 have, in effect, a pronounced dampening action, that overcomes any vibratory tendencies of their respective associated shoes.

Figure 9:
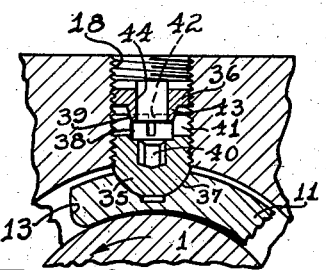
Fig. 9 is a fragmentary sectional view illustrating a modification of the mounting or backing member for each bearing shoe.

Fig. 9 illustrates a modification of the arrangement by which the backing member for each rocker shoe is locked in its desired position of adjustment. In the arrangement shown by Fig. 9 said backing member comprises two externally-threaded parts 35 and 36, the former having ball-and-socket engagement 37 with the shoe and having a central recess 38, with tapered mouth 39 and an inner hexagonal portion 40, to receive an adjusting wrench, not shown. Radial saw slots 41 and 42 in member 35 enable said member to be expanded by the inward screwing of the other member 36, the latter having a tapered portion 43 for engagement with the taper bore 38 of member 35, and having a bore 44 for passage of said adjusting wrench. After the inner part 35 has been adjusted, said outer part is screwed inwardly to expand said part 35 and bind its threads against those of the tapped hole 18.

I claim:

1. In a bearing construction, a rotary member having a bearing surface, means for supplying lubricant thereto, and a plurality of segmental shoes arranged in a circular series about said surface, each shoe being mounted for rocking movement to form with said bearing surface a wedge-shaped pocket for the lubricant film on said bearing surface, the leading end of each shoe overhanging the entrance to its pocket and presenting across substantially the shoe's entire thickness a convex surface in opposition to the lubricant escaping from beneath the trailing end of the preceding shoe of said series.

2. In a bearing construction, a rotary member having a bearing surface, means for supplying lubricant thereto, and a plurality of segmental shoes arranged in a circular series about said surface, each shoe being mounted for rocking movement to form with said bearing surface a wedge-shaped pocket for the lubricant film on said bearing surface, the opposed ends of adjacent shoes having convex surfaces defining between said shoes a space or gap whose cross section is of substantially Venturi form, on a center line or axis that is non-radial to the axis of said rotary member, whereby to reduce the turbulence of said lubricant in its passage through the space between said shoes.

3. In a bearing construction, a rotary member having a bearing surface, means for supplying lubricant thereto, and a plurality of segmental shoes arranged in a circular series about said surface, each shoe being mounted for rocking movement to form with said bearing surface a wedge-shaped pocket for the lubricant film on said bearing surface, the leading end of each shoe overhanging the entrance to its pocket and presenting across substantially the shoe's entire thickness a convex surface in opposition to the lubricant escaping from the pocket of the preceding shoe of the series and the trailing end of each shoe having a convex surface cooperating with said first-mentioned convex surface to form between said shoes a space or gap whose cross section is of substantially Venturi form.

4. In a bearing construction of the class described, a rotary member having a bearing surface, a plurality of segmental shoes arranged in a circular series about said surface, each shoe being rockable to form with said surface a wedge-shaped lubricant pocket, a backing member for each shoe having a ball-and-socket connection therewith, a passage through each backing member to conduct lubricant under pressure to each shoe substantially in the line of its support and means for independently adjusting the pressure in each passage.

5. In a bearing of the class described, a rotary member having a bearing surface, a plurality of segmental shoes arranged in a circular series about said bearing surface, an adjustable backing member for each shoe providing a ball-and-socket mounting therefor, permitting rocking of each shoe to form with said surface a wedge-shaped lubricant pocket, a lubricant passage through each shoe and its backing member and communicating with the associated pocket, means for supplying lubricant under pressure to the several lubricant passages and means for independently adjusting the pressure in each passage.

6. In a bearing of the class described, a rotary member having a bearing surface, a plurality of segmental shoes arranged in a circular series about said bearing surface, an adjustable backing member for each shoe providing a ball-and-socket mounting therefor, permitting rocking of each shoe to form with said surface a wedge-shaped lubricant pocket, a lubricant passage through each shoe and its backing member and communicating with the associated pocket, means for supplying lubricant under pressure to said passages, and means for independently adjusting the pressure in each passage.

7. In a bearing construction of the class described, a rotary member having a bearing surface, a plurality of segmental shoes arranged in a circular series about said surface and each rockably supported to form with said surface a wedge-shaped lubricant pocket, means for supplying lubricant under pressure to each shoe substantially in the line of its support, and means for individually adjusting the pressure effective on each shoe.

PETER M. SAMPATACOS.